July 27, 1926.  1,594,037
H. BALKE ET AL
OVERLOAD CURRENT PROTECTIVE SYSTEM AND APPARATUS FOR
MULTIPHASE DYNAMO MACHINES
Filed May 14, 1924
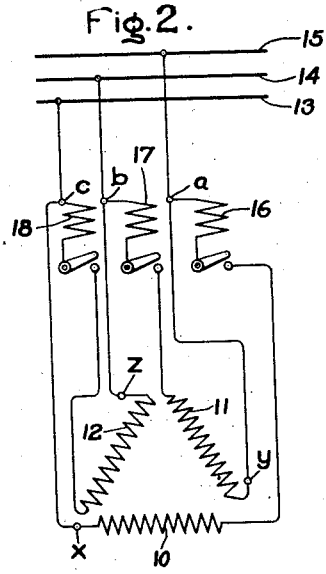
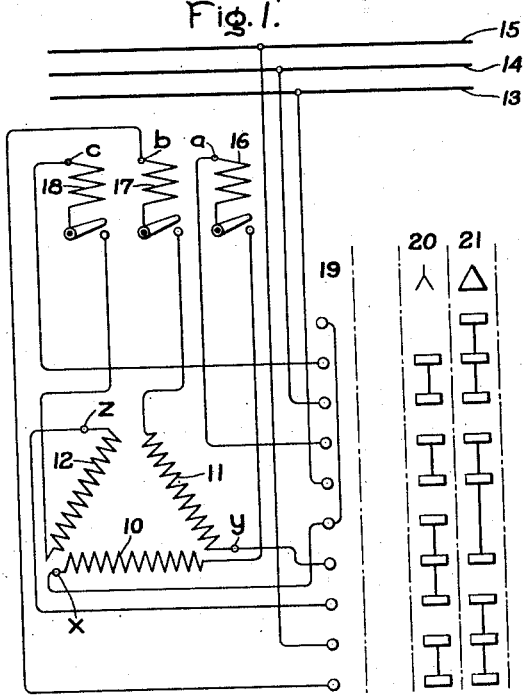
Inventors:
Hermann Balke
Ludwig Riefstahl,
Richard Zaudy,
by
Their Attorney.

Patented July 27, 1926.

1,594,037

UNITED STATES PATENT OFFICE.

HERMANN BALKE, OF BERLIN, LUDWIG RIEFSTAHL, OF JOHANNISTHAL, AND RICHARD ZAUDY, OF SCHONEBERG, GERMANY, ASSIGNORS TO GENERAL ELECTRIC COMPANY, A CORPORATION OF NEW YORK.

OVERLOAD CURRENT PROTECTIVE SYSTEM AND APPARATUS FOR MULTIPHASE DYNAMO MACHINES.

Application filed May 14, 1924, Serial No. 713,345, and in Germany May 29, 1923.

This invention relates to overload current protective systems and apparatus for multiphase dynamo electric machines, particularly for multiphase dynamo electric machines having a plurality of windings arranged to be connected in different circuit relations to vary the current capacity of the machine.

The invention has for its object the provision of a system and apparatus whereby the individual windings of such machines are protected from an overload current of a certain predetermined value when connected in each of the several circuit relations.

Thus by means of our present invention, the windings of a three-phase alternating current motor which are arranged to be connected in star or in delta circuit relation may be effectively protected from an overload current of a certain predetermined value regardless of the well known fact that with a given load the motor line current when delta connected is 1.73 times larger than when star connected.

In prior overload current protective systems for three-phase alternating current motors, with which we are familiar, ordinarily an electromagnetically actuated circuit interrupter or a fuse is connected in the motor supply lines in such manner that the motor circuit is interrupted upon the line current exceeding a certain maximum value. In protecting alternating current motors having windings which are sometimes connected in star and sometimes in delta, these prior arrangements have the disadvantage that when the circuit interrupters are calibrated to respond to predetermined values of line current with a particular one of the star-delta motor connections, they do not afford adequate protection to the motor for the other of the motor connections.

In applying our invention to protect adequately the windings of such a three-phase alternating current motor in both the star and the delta connection, an overload current protective device such as an electromagnetically actuated circuit breaker or a fuse is connected directly to the terminal lead of at least one of the motor windings in such manner that the protective device is transposed along with the particular winding in both the star and the delta connection of the motor. Hence, the overload device at all times is energized responsively to the current in the winding itself as distinguished from the motor line current.

For a better understanding of our invention, reference is had to the following description taken in connection with the accompanying drawing in which Figs. 1 and 2 diagrammatically illustrate a protective system for a three-phase star-delta alternating current motor arranged according to our invention.

The novel features which we believe to be characteristic of our invention are set forth with particularity in the appended claims.

Referring first to Figs. 1 and 2 of the drawing, the windings 10, 11 and 12 represent a three-phase alternating current motor which may be operated from the three-phase supply lines 13, 14 and 15 with the windings connected in star circuit relation or in delta circuit relation as shown. The electro-magnetically actuated circuit interrupters 16, 17 and 18 are connected between the supply lines and the motor winding for protecting the latter from overload current when connected both in star and in delta. In accordance with our invention the overload protective devices 16, 17 and 18 are connected directly in corresponding terminal leads of each of the windings 10, 11 and 12 respectively, so that in the delta connection, as well as in the star connection, each of the devices carries only the current flowing in the corresponding windings of the motors. In the embodiment of the invention shown in Fig. 1, the leads from both ends of each of the motor windings 10, 11 and 12 are connected to suitable terminals $a$ and $x$, $b$ and $y$, and $c$ and $z$ respectively and the operating windings of the electro-magnetic circuit interrupting devices 16, 17 and 18 are connected in the leads to the terminals $a$, $b$ and $c$ from corresponding ends of each of the windings.

Suitable switch mechanism such as a drum controller, shown in development as having a set of stationary contacts and two sets of movable contact segments 20 and 21 respectively, is provided for interconnecting the motor terminals $ax$, $by$ and $cz$, so as to place the motor windings 10, 11 and 12 in star and in delta circuit relation as well as to connect the motor to the supply lines 13, 14 and 15 for operation thereof.

With the controller in the "off" position as shown, the motor windings 10, 11 and 12 are entirely disconnected from the supply lines 13, 14 and 15. Upon operating the controller to engage the set of movable contact segments 20 with the cooperating stationary contacts 19, the terminals $x$, $y$ and $z$ of the respective windings 10, 11 and 12 are connected together and the terminals $a$, $b$ and $c$ to the supply lines 13, 15 and 14 respectively are connected. It will be evident that the motor windings 10, 11 and 12 thus are connected in star circuit relation to the supply line with the overload protective devices 16, 17 and 18 respectively in circuit with a corresponding winding. To adequately protect the motor, the several protective devices may be calibrated to respond to the safe maximum current through each winding.

If now the set of movable contact segments 21 be moved into engagement with the cooperating stationary contacts 19, the terminals $a$, $b$ and $c$ of the windings 10, 11 and 12 respectively are interconnected with the other terminals $x$, $y$ and $z$ to place the windings in delta circuit relation and the windings are connected to the supply conductors 13, 14 and 15. The resulting circuit relations of the windings 10, 11 and 12 and the electromagnetic circuit interrupters 16, 17 and 18 are diagrammatically illustrated in Fig. 2 wherein it will be seen that although the motor windings are connected in delta relation, nevertheless, the operating winding of each of the electromagnetic circuit interrupters 16, 17 and 18 is still energized responsively to the current flowing in each of the corresponding motor windings 10, 11 and 12. Thus with the same current calibration of the circuit interrupters 16, 17 and 18 as in the star connection, the individual windings 10, 11 and 12 are adequately protected in the delta circuit relation.

While we have illustrated the several overload protective devices 16, 17 and 18 as electromagnetically actuated circuit interrupters, it will be evident to those skilled in the art that a fuse or other suitable overload current protective means may be employed. Also, the invention is not limited to the use of individual circuit interrupters for each of the motor windings inasmuch as the invention may be carried into effect by providing a circuit interrupter having a current responsive means in at least one of the motor winding circuits.

Having thus described the principle of operation of our invention together with a preferred form of apparatus for carrying the same into effect, we desire to have it understood that the apparatus shown is only illustrative and that the invention may be carried out by other means.

What we claim as new and desire to secure by Letters Patent of the United States, is:

1. The combination with a dynamo electric machine having a plurality of windings, of means for interconnecting the said windings in different circuit relations, and overload current protecting means connected in circuit with at least one of said windings and arranged to be interconnected therewith so as to be responsive to the current therein in each of said circuit relations.

2. The combination with a three-phase alternating current dynamo electric machine, of means for interconnecting the windings of said machine in star and in delta circuit relations, and overload current protecting means connected in circuit with at least one of said windings and arranged to be interconnected therewith so as to be responsive to the current therein in each of said circuit relations.

3. The combination with a three-phase alternating current dynamo electric machine, of means for interconnecting the windings of said machine in star and in delta circuit relations, an overload current protecting means connected in circuit with each of said windings and arranged to be interconnected therewith so as to be responsive to the current therein in each of said circuit relations.

4. The combination with a three-phase alternating current motor having terminal leads from both ends of each winding, of an overload current protecting device connected in circuit with at least one of said leads with the device inserted in the circuit between the winding and the terminal of the lead, and switch mechanism for connecting the said terminal leads of the motor to a source of supply with the said windings in delta and in star circuit relations with the said protective device responsive to the current in one of the windings in each relation.

5. The combination with an alternating current motor having three-phase windings with terminal leads from both ends of each winding, of overload current protective means for the motor comprising circuit controlling elements connected in corresponding terminal leads of each winding and inserted in the circuit between the winding and the terminal of the lead to be energized responsively to a predetermined current therein, and switch mechanism for controlling the interconnection of said terminal leads to place the said winding in star and delta circuit relations and for connecting the motor to a source of supply for operation thereof with each of said protective means responsive to the current in the corresponding winding in each relation.

6. The combination with an alternating current motor having three-phase windings with terminal leads from both ends of each winding, of automatic overload current protective means for the motor comprising an electromagnetically actuated circuit breaker having an operating winding connected in corresponding terminal leads of each of said motor windings and inserted in the circuit between the winding and the terminal of the lead to be energized responsively to a predetermined current therein, and switch mechanism operable at will to connect the said terminal leads with the motor windings in star and in delta circuit relations to a source of supply for operation of the motors with the operating winding of each of said circuit breakers responsive to the current in the corresponding motor winding in each relation.

In witness whereof, we have hereunto set our hands this 25th day of April 1924.

HERMANN BALKE.
LUDWIG RIEFSTAHL.
RICHARD ZAUDY.